United States Patent
Campbell

(10) Patent No.: US 7,070,646 B2
(45) Date of Patent: Jul. 4, 2006

(54) PHTHALOCYANINE BASED INKS WITH ABSORPTION MAXIMA IN THE NEAR INFRA-RED AND VISIBLE SPECTRUM

(75) Inventor: James Stanley Campbell, Manchester (GB)

(73) Assignee: Avecia Limited, Manchester (GB)

( * ) Notice: Subject to any disclaimer, the term of this patent is extended or adjusted under 35 U.S.C. 154(b) by 38 days.

(21) Appl. No.: 10/494,194

(22) PCT Filed: Oct. 2, 2002

(86) PCT No.: PCT/GB02/04482

§ 371 (c)(1),
(2), (4) Date: Apr. 29, 2004

(87) PCT Pub. No.: WO03/038003

PCT Pub. Date: May 8, 2003

(65) Prior Publication Data

US 2004/0248027 A1    Dec. 9, 2004

(30) Foreign Application Priority Data

Oct. 31, 2001   (GB)   .................. 0126103.1

(51) Int. Cl.
*C09D 11/02* (2006.01)
*G03G 9/09* (2006.01)

(52) U.S. Cl. ............. 106/31.49; 106/31.78; 430/114; 427/256

(58) Field of Classification Search ........... 430/114, 430/117; 106/31.27, 31.6, 31.49, 31.78; 427/256
See application file for complete search history.

(56) References Cited

U.S. PATENT DOCUMENTS

| | | | | |
|---|---|---|---|---|
| 3,357,989 A | * | 12/1967 | Bryne et al. | ........... 540/122 |
| 3,903,107 A | | 9/1975 | Griffiths et al. | |
| 4,539,284 A | | 9/1985 | Barbetta et al. | |
| 5,684,069 A | * | 11/1997 | Auslander | ........... 524/88 |
| 6,513,921 B1 | * | 2/2003 | Houle | ........... 347/96 |

FOREIGN PATENT DOCUMENTS

| | | |
|---|---|---|
| EP | 523959 A2 | 1/1993 |
| EP | 933407 A1 | 4/1999 |
| EP | 1061419 A1 | 12/2000 |
| JP | 570036693 | 2/1982 |
| JP | 580011568 | 1/1983 |
| JP | 59138284 | 8/1984 |
| JP | 100140022 | 5/1998 |
| JP | 110035583 | 2/1999 |
| JP | 110323311 | 11/1999 |
| JP | 2001271003 | 10/2001 |
| WO | WO 01/09252 | 2/2001 |

* cited by examiner

*Primary Examiner*—John L Goodrow
(74) *Attorney, Agent, or Firm*—Morgan Lewis & Bockius LLP

(57) ABSTRACT

The invention provides an ink composition comprising a charge generating material and a medium wherein the charge generating material absorbs radiation in both the near infra-red and visible regions of the electromagnetic spectrum. Also provided is an electrophotographic toner composition comprising a binder resin and the charge generating material. The compositions are useful in, for example, security marking wherein the composition is printed on an article or substrate. Methods of establishing the authenticity of an article or substrate are also provided which comprise detecting an absorption of infra-red radiation by the charge generating material.

25 Claims, No Drawings

PHTHALOCYANINE BASED INKS WITH ABSORPTION MAXIMA IN THE NEAR INFRA-RED AND VISIBLE SPECTRUM

FIELD OF THE INVENTION

This invention relates to charge generating materials and compositions containing them, for example inks and toners for printing and electroreprographic use, to printing processes using such materials and compositions on a range of substrates and articles, particularly for use in security marking or labelling and to uses of such materials and compositions, e.g. in security applications. Such materials and compositions are typically used in security printing applications for counterfeit and fraud detection.

RELATED BACKAROUND ART

Inks are known which comprise substances acting as security markers which absorb little visible light but which are infrared absorbents. These marker substances may be included in inks in order to permit the easy checking of matter printed with such inks, to assess their authenticity. The former is of significance if counterfeit goods are available, particularly if the safety of users is threatened, for example in the case of medicines or safety equipment such as brake linings. In any case, the reputation and business of the authentic supplier will be threatened if counterfeit goods are available and precautions may be required.

Some substances represent an additional component of the ink and add to its cost but still suffer disadvantages. In general they show some absorption in the visible range which limits the concentration which can be used without unacceptable discolouration of the ink from either wavelength shifts or dulling effects which limits the magnitude of characteristic absorption which such inks can exhibit outside the visible range. The problem may be increased if the ink includes blue or green colorants because the absorption band of such colorants is likely to extend into the infrared region and to mask at least in part the absorption of the marker substance.

We have found that such difficulties can be overcome by the use of charge generating materials which have both a strong absorption peak in the infrared range and a significant absorption in the visible region of the electromagnetic spectrum sufficient to be an effective colorant. The term charge generating material used herein defines a material which is capable of absorbing electromagnetic radiation in the visible region to generate a cation-electron pair. Although such materials may typically have application in electroreprographic processes to generate charge on a photoreceptor drum in an electroreprographic machine, it should be understood that in the present invention these materials are not employed for their ability to generate charge. Instead, it has been found that such materials having absorptions in both the near infra-red and visible regions of the electromagnetic spectrum are useful, for example, in inks for security marking.

SUMMARY OF THE INVENTION

According to the first aspect of the present invention there is provided an ink composition comprising a charge generating material and a medium wherein the charge generating material absorbs radiation in both the near infra-red and visible regions of the electromagnetic spectrum.

The charge generating material preferably has two absorption maxima or peaks: one in the near infra-red region and one in the visible region of the electromagnetic spectrum. Preferably, the charge generating material has an absorption maximum at a wavelength greater than 700 nm, more preferably in the region from 700 to 1500 nm, most preferably from 700 to 1000 nm, and an absorption maximum in the region from 400 nm to 700 nm, more preferably from 500 to 700 nm, most preferably from 600 to 700 nm. It is desirable that the two absorptions are quite separate, preferably that the separation is at least 50 nm, more preferably at least 80 nm, most preferably at least 100 nm.

Preferably the height of the absorption peak in the near infrared range bears a fixed ratio to the absorption peak in the visible range. This aids the authentication process when the present materials are used in security applications.

The strength of the absorption (i.e. as determined by the area under the peak) in the visible region is preferably from 20 to 500% of the strength of the absorption in the near infra-red region, more preferably from 30 to 200%, most preferably 50 to 100% and especially 80 to 95%.

The peak in the infrared range is preferably sharp; at 80% of its height judged from the baseline it is preferably of bandwidth at most 150 nm and more preferably at most 100 nm.

It is also preferable that the charge generating material is stable and adequately lightfast. The quantity used of such charge generating materials is preferably up to 10% by weight of the total composition, producing a very easily detectable peak in the infrared range. The benefit is particularly relevant in the case where the charge generating material is a green and especially a blue colorant.

The charge generating material may be the only colorant of inks of corresponding colour. Alternatively the charge generating material may be used with one or more colorants of the same, similar or different colour; for example, a blue charge generating material can be used with another blue colorant such as a dye or pigment, or, a blue charge generating material can be used to make green or brown inks which additionally contain respectively yellow or magenta colorants. The charge generating material may also be used in mixtures of colorant or for adjusting or optimising the shades of dyes and/or pigments. Mixtures of two or more different charge generating materials according to the invention may be used The charge generating materials of the present invention act as security markers and may be used in monochrome and/or multicolour printing.

The charge generating material is preferably selected from the following classes of compounds: phthalocyanines and their metal complexes, naphthalocyanines and their metal complexes, cyanines or polymethines, squaryliums, croconiums, iminiums, diimminiums, pyryliums, quinones, azo dyes and their metal complexes. Each of the charge generating materials may be optionally substituted.

Preferably, the charge generating material is a phthalocyanine, and is chosen from compounds as shown in Formula (1) where M represents hydrogen, a metal, metal hydroxide, metal oxide or alkoxide, metal halide such as fluoride, chloride, bromide or iodide and k is the inverse of half the valency of M.

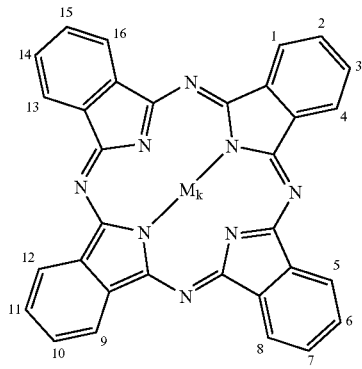

Formula (1)

In a preferred subgroup of phthalocyanines, the peripheral carbon atoms 1–16 in formula 1 are unsubstituted, i.e. they are bonded to hydrogen. Preferably, M is selected from H, GaOH, Ga(alkoxide), TiO and VO. When M=Ga(alkoxide) the alkoxide is preferably straight or branched chain $C_{1-8}$ alkoxide, more preferably $OCH_3$. Many such phthalocyanine compounds exist in several different crystal forms or polymorphs, resulting from molecular association within the crystal lattice. The properties of these compounds are influenced by this polymorphism; for example, there is known to be a correlation between their electrical properties such as photosensitivity and polymorphic form. Highly photosensitive phthalocyanines of interest in the present invention exhibit a common molecular overlapping pattern in their crystal structures. A result of this is an absorption spectrum which shows two peaks largely shifted from that of a monomer spectrum; one is red-shifted and the other is blue-shifted. Especially preferred phthalocyanines are the polymorph type X form of metal free (M=H, k=2) phthalocyanine, as described in U.S. Pat. No. 3,357,989 and by Sharp and Landon in *J.Phys.Chem.*, (1968), 72 (9), pp3230–3235, the polymorph type Y form and Phase I & 11 forms of titanyloxy phthalocyanine (M=TiO, k=1), the polymorph Phase II form of vanadyloxy phthalocyanine (M=VO, k=1), the polymorph Phase V form of hydroxygallium phthalocyanine (M=GaOH, k 1) and methoxygallium phthalocyanine (M=GaOMe, k=1) as described by Dalmon et.al. in J. Imaging Science & Technology, 1996, 40(3), p 249–253, and Oka and Okada in J. Imaging Science & Technology, 1993, 37(6), pp607–609.

The medium in the present invention may be a liquid medium or low melting point solid medium and may optionally contain one or more additives. Where the medium is a liquid, preferred media include water, a mixture of water and an organic solvent, or an organic solvent free from water. It is preferred that the organic solvent present in the mixture of water and organic solvent is a water-miscible organic solvent or mixture of such solvents. Preferred water-miscible organic solvents include $C_{1-6}$-alkanols, linear amides, ketones and ketone-alcohols, water-miscible ethers, diols, triols, mono-$C_{1-4}$-alkyl ethers of diols, preferably mono-$C_{1-4}$-alkyl ethers of diols having 2 to 12 carbon atoms, cyclic amides, cyclic esters, and sulphoxides. Examples of suitable liquid ink media comprising a mixture of water and one or more organic solvents are described in U.S. Pat. No. 4,963,189, U.S. Pat. No. 4,703,113, U.S. Pat. No. 4,626,284 and EP 4,251,50A. Preferably, the charge generating material is insoluble in the medium. Where the material exists with a particular morphological form which provides the required spectral properties, if the charge generating material is soluble in the medium, then this form may typically be lost upon dissolution. The charge generating material may be present as a suspension, dispersion, colloidal suspension or otherwise.

Where no water is present the organic solvent may be selected from those well recited in the art, according to the standard categorization of gravure inks, from the following classes of compound: aliphatic hydrocarbons, aromatic hydrocarbons, esters, ketones and alcohols. Typical aliphatic hydrocarbon solvents include hexane, textile spirits, naphtha and mineral spirits well known in the trade; aromatic hydrocarbon solvents typically comprise toluene or xylene; esters are typically ethyl acetate, isopropyl acetate, n-propyl acetate and butyl acetate; ketones are typically acetone and methyl ethyl ketone; alcohols are selected from methanol, ethanol, propan-1-ol, propan-2-ol and butanols, especially ethanol or propan-2-ol. Blends of these categories of solvents may also be used.

Where the medium is a low melting point solid it may be selected from solids whose melting point or $T_g$ is less than 200° C., preferably less than 150° C., more preferably less than 100° C., most preferably less than 50° C. Such media include compounds which are usually solid or semi-solid at ambient temperatures. Typical compounds include waxes, polymers, alkanes, alcohols and diols.

The medium may also comprise resins to impart adhesion and resistance properties to the printed ink film, and to fix the agents (especially the pigmentary materials) to the substrate surface. Such resins are polymers which may be film formers or non-film formers. Resins may be selected from but are not limited to the following classes of compounds: acrylic, alkyd, cellulosic, chlorinated rubber, epoxy, nitrocellulose, phenolic, polyamide, polyester, polyketone, polystyrene, polyurethane, rosin-based, Saran, shellac and vinyl and products of the reaction of such resins with oils such as linseed oil or tung oil. Optionally the medium may also comprise a plasticiser to achieve film formation. Typically a plasticiser will be selected from non-volatile, low molar mass compounds which are compatible with the main resins. Optionally one or more additives may be present to modify the properties of the composition in some beneficial way, for example to prolong stability or to optimise the performance of the /dispersion when in contact with the substrate. Such additives may include one or more of the following types: surfactants to modify surface tension; hydrotroping agents to disaggregate the system and prevent excess moisture loss; co-solvents to prevent excess moisture loss, for instance ink solvents such as Ink Solvent 27/29, available from Shell Chemicals; acids or alkalis to achieve the optimum pH of the composition; buffers to maintain the optimum pH range of the composition; polymers to act as viscosity modifiers; crystal poisoners to prevent crystallisation in dispersions; associative thickeners for dispersion stability; biocides where /dispersions are expected to have a finite shelf life; penetrating solvents; metallic driers, typically soaps of cobalt, manganese and other metals formed with organic acids such as linoleic, naphthenic and octanoic, to aid drying of the ink film by oxidation; waxes such as polyethylene, Fischer Tropsch, Teflone™ or vegetable waxes; oils such as linseed oil; white pigments to optimise the final shade of the printed ink such as titanium dioxide or zinc dioxide; transparent white pigments or extenders such as alumina hydrate, magnesium carbonate, calcium carbonate, precipitated barium sulphate, talc and clay; antioxidants to confer stability against premature oxidation such as eugenol and ionol.

In a specific embodiment, the composition may be prepared by addition of a charge generating material according to the invention in given quantity to a liquid medium in which it is known to disperse, followed by stirring for such time until a homogeneous dispersion of known weight per unit volume is obtained, followed by the addition of such additives as are necessary to maintain the stability and improve the properties of this dispersion. In yet another specific embodiment, where the charge generation material is a non-self dispersing pigment, it is necessary to add the correct proportion of a dispersing agent that may be non-ionic, anionic or cationic, and this would normally be done during pigment milling although additional dispersing agent may be added to the final composition for stability.

According to another aspect, the invention provides a toner composition for use in an electrophotographic process comprising a binder resin and a charge generating material wherein the charge generating material absorbs radiation in both the near infrared and visible regions of the electromagnetic spectrum. The preferred features described above relating to the charge generating material are equally applicable to the toner. The toner may be a conventionally produced toner wherein the charge generating material is dispersible in the binder resin, and these and any other components mentioned below are compounded and kneaded together. After cooling and pulverizing the resultant mixture, the particles are classified. Alternatively, the toner may be a chemically produced toner.

The binder resin of the toner may comprise one or more polymers, mixtures of polymers being appropriate where polymers of different molecular weight are used to control the molecular weight distribution and the melt rheology properties of the toner. Examples of suitable polymers are styrene-acrylate copolymers, styrene-butadiene copolymers, polyesters and hydrocarbon resins.

The charge generating material may be the only colorant of toners of corresponding colour. Alternatively the charge generating material may be used with one or more colorants of the same, similar or different colour; for example, a blue charge generating material can be used with another blue colorant such as a dye or pigment, or, a blue charge generating material can be used to make green or brown toners which additionally contain respectively yellow or magenta colorants. The charge generating material may also be used in mixtures of colorant or for adjusting or optimising the shades of dyes and/or pigments. Mixtures of two or more different charge generating materials may be used in the toner.

The toner may incorporate a charge control agent to enhance uptake of electrical charge and a release agent, e.g. wax, to aid release from the fusion roller. Suitable charge control agents include metal complexes, such as complexes of Zn, Al, Fe or Cr, and polymeric materials, such as phenolic polymers. Suitable waxes include hydrocarbon waxes, such as paraffin, polyethylene or polypropylene waxes, waxes derived from carbon monoxide and hydrogen, such as Fischer-Tropsch waxes, natural product waxes, such as carnauba wax, and synthetic waxes, such as ester or amide waxes. The toner may also contain surface additives, such as silica, titania, alumina or polymeric particles, to control flow, charging performance or transfer properties.

The invention also comprises the use of a charge generating material or composition comprising a charge generating material as described above in security applications, for example as a security marker, preferably where the composition is applied by a variety of methods to articles or substrates. Examples of substrates are generally paper, including rag paper, preferably currency grade paper, plastics-coated or laminated paper, and plastics such as bankcard-grade PVC, or plastic paper, e.g. nonwoven plastic paper. Examples of articles include documents, packaging or goods bearing a printed mark such as banknotes, banknote thread, currency, travellers' cheques, bonds, certificates, stamps, lottery tickets, ownership documents, passports, identity cards, credit cards, charge cards, access cards, smart cards, brand authentication labels and tags, and tamperproof labels.

According to a further feature of the present invention, there is provided a method of establishing the authenticity of the article or substrate whereby the article or substrate is marked with a composition according to the invention and a characteristic absorption of infrared radiation by the mark is detected, e.g. by standard spectroscopic methods and optionally compared with a peak intensity of absorption of radiation in the visible range. Compositions may for example be applied by printing the composition onto the article or substrate. The method of printing is preferably selected from the following: offset lithographic, gravure, ink jet, intaglio, and letterpress. The composition of the invention may be used in matrix or daisy-wheel printer inks and non-impact printing methods.

EXAMPLES

The invention is further illustrated by reference to the following examples:

1. Preparation of Charge Generating Materials 1.1 X-Form Metal-Free phthalocyanine (Formula 1, M=H, k=2)

This was prepared and characterised in accordance with literature references US patent number U.S. Pat. No. 3,357,989 and Sharp and Landon in *J.Phys.Chem.*, (1968), 72 (9), pp3230–3235.

1.2 Y Form and Phase I & 11 Forms of titanyloxy phthalocyanine (M=TiO, k=1)

These were prepared and characterised in accordance with literature references Fujimati et al, J. Imaging Science & Technology, 1993, 37, 13, Saito et. al., J. Phys. Chem., (1994), 98(11), 2726–8 and Oka et.al., Jpn. J. Appi. Phys., 1992, 31, 2181.

1.3 Polymorph Phase II form of vanadyloxy phthalocyanine (M=VO, k=1)

This was prepared and characterised in accordance with literature reference Ziolo et.al., J. Chem. Soc., Dalton Trans., (1980), (11), 2300–2.

1.4 Polymorph Phase V Form of hydroxygallium phthalocyanine (M=GaOH, k=1)

This was prepared and characterised in accordance with literature reference Dalmon et.al. in J. Imaging Science & Technology, 1996, 40(3), p 249–253.

1.5 Methoxygallium phthalocyanine (M=GaOMe, k=1)

This was prepared and characterised in accordance with literature reference Dalmon et.al. in J. Imaging Science & Technology, 1996, 40(3), p 249–253.

2. Security Printing

The following printing ink compositions were prepared using the X-form metal free phthalocyanine as prepared above:

| 2.1 Intaglio printing ink formulation containing X-form phthalocyanine pigment | |
| --- | --- |
| Addition product of tung oil and maleic acid modified phenolic resin in a high boiling mineral oil (PKWF 28/31) | 35% |
| Long oil alkyd resin | 7.5% |
| Alkylphenolic resin modified with raw tung oil in ink solvent 27/29 (Shell Industrial Chemicals) | 16% |
| Polyethylene wax | 1.5% |
| Calcium carbonate | 32.8% |
| X-form phthalocyanine pigment | 2% |
| Ink solvent 27/29 (Shell Industrial Chemicals) | 5% |
| Cobalt octoate (11% metal) | 0.1% |
| Manganese octoate (10% metal) | 0.1% |

| 2.2 Lithographic printing ink formulation containing X-form phthalocyanine pigment | |
| --- | --- |
| Phenolic resin modified resin cooked with linseed oil | 35% |
| Long oil alkyd resin | 44.2% |
| Polyethylene wax | 2% |
| Ink solvent 27/29 (Shell Industrial Chemicals) | 2% |
| Cooked linseed oil | 5% |
| X-form phthalocyanine pigment | 5% |
| Titanium dioxide | 6% |
| Cobalt octoate (10% metal) | 0.8% |

| 2.3 Letterpress ink formulation containing X-form phthalocyanine pigment | |
| --- | --- |
| Phenolic resin modified resin cooked with linseed oil | 31% |
| Long oil alkyd resin | 42.2% |
| Polyethylene wax | 2% |
| Ink solvent 27/29 Shell Industrial Chemicals | 2% |
| Cooked linseed oil | 5% |
| X-form phthalocyanine pigment | 5% |
| Titanium dioxide | 6% |
| Silicium dioxide (AEROSIL 200 - Degussa - Huels AG) | 6% |
| Cobalt octoate (10% metal) | 0.8% |

| 2.4 Gravure ink formulation containing X-form phthalocyanine pigment | |
| --- | --- |
| Ethanol | 20% |
| Ethyl acetate | 20% |
| Dicyclohexylphthalate (Unimoll 66, supplied by Bayer) | 4% |
| Fumaric acid modified rosin (Rokramar 7200, supplied by Robert Kraemer GmbH & Co) | 4% |
| Polyvinylbutyral resin (Pioloform BN 18, supplied by Wacker-Chemie) | 10% |
| X-form phthalocyanine pigment | 3% |
| Ethanol | 12% |
| Ethyl acetate | 27% |

The printing inks were prepared by dispersing the compounds in a bead mill. In the gravure composition a proportion of the ethanol (20%) and the ethylacetate (20%) was added during the dispersion process, the remaining amount being added after dispersion. Prints were made using standard industry printing apparatus and analysed using a standard UV-VIS-NIR spectrometer.

The invention claimed is:

1. In a security method comprising application of an ink composition, the improvement wherein the composition comprises a charge generating material and a medium wherein the charge generating material has an absorption maximum in each of the near infra-red region from 700 to 1500 nm and visible region from 400 to 700 nm of the electromagnetic spectrum and is a compound selected from the polymorph type X form of metal free phthalocyanine, the polymorph type Y form and Phase I & II forms of titanyloxy phthalocyanine, the polymorph Phase II form of vanadyloxy phthalocyanine, and the polymorph Phase V forms of hydroxygallium phthalocyanine and methoxygallium phthalocyanine and wherein the charge generating material acts as a colorant of the composition.

2. A method according to claim 1 wherein the charge generating material is the X-form of metal free phthalocyanine.

3. A method according to claim 1 wherein the charge generating material has an absorption maximum in the region from 500 to 700 nm.

4. A method according to claim 3 wherein the charge generating material has an absorption maximum in the region from 600 to 700 nm.

5. A method according to claim 1 wherein the two absorption maxima are separated by at least 50 nm.

6. A method according to claim 1 wherein the strength of the absorption in the visible region is between 20 and 500% of the strength of the absorption in the near infra-red region.

7. A method according to claim 1 wherein the peak in the near infra-red range is, at 80% of its height judged from the baseline, of bandwidth at most 150 nm.

8. A method according to claim 1 wherein the charge generating material is the only colorant of the ink.

9. A method according to claim 1 wherein the charge generating material is used with one or more additional colorants of the same, similar or different colour.

10. A method according to claim 1 the ink composition comprising a mixture of two or more different charge generating materials.

11. A method according to claim 1 wherein the charge generating material is insoluble in the medium.

12. A method according to claim 1 wherein the composition is applied by a printing method to an article or substrate.

13. A method according to claim 12 wherein the printing method is selected from the following: offset, gravure, ink jet, intaglio, electrophotography.

14. A method according to claim 1 wherein the security application is a method of establishing the authenticity of an article or substrate which has been marked with the said ink composition comprising detecting a characteristic absorption of infrared radiation by the mark.

15. A method according to claim 14 the method further comprising comparing the characteristic absorption of infrared radiation with an absorption of radiation in the visible range.

16. A method according to claim 15 wherein the height of the absorption peak in the near infrared range is compared with the height of the absorption peak in the visible range.

17. In a security application of an ink composition, the improvement wherein the composition comprises a charge generating material and a medium wherein the charge generating material has an absorption maximum in each of the near infra-red region from 700 to 1500 nm and visible region from 400 to 700 nm of the electromagnetic spectrum, wherein the charge generating material is the only colorant of the ink.

18. A method of establishing the authenticity of an article or substrate which has been marked with an ink composition, the ink composition comprising a charge generating material and a medium wherein the charge generating material has an absorption maximum in each of the near infra-red region from 700 to 1500 nm and visible region from 400 to 700 nm of the electromagnetic spectrum, the method comprising detecting a characteristic absorption of near infrared radiation by the mark and further comprising comparing the characteristic absorption of near infrared radiation with an absorption of radiation in the visible range, the charge generating material acting as a colorant of the ink composition.

19. A method according to claim 18 wherein the height of the absorption peak in the near infrared range is compared with the height of the absorption peak in the visible range.

20. A method according to claim 5 wherein the two absorption maxima are separated by at least 80 nm.

21. A method according to claim 5 wherein the two absorption maxima are separated by at least 100 nm.

22. A method according to claim 6 wherein the strength of the absorption in the visible range is between 30 to 200% of the strength of the absorption in the near infrared region.

23. A method according to claim 6 wherein the strength of the absorption in the visible range is between 50 to 100% of the strength of the absorption in the near infrared region.

24. A method according to claim 6 wherein the strength of the absorption in the visible range is between 80 to 90% of the strength of the absorption in the near infrared region.

25. A method according to claim 7 wherein the peck in the near infrared range is, at least 80% of its height judged from the baseline, of bandwidth at most 100 nm.

* * * * *